United States Patent [19]
Furlani et al.

[11] Patent Number: 5,781,816
[45] Date of Patent: Jul. 14, 1998

[54] ELECTROMAGNETIC DEVICE FOR PROVIDING A HARD STOP FOR MOVING BLADE APERTURE SYSTEMS

[75] Inventors: Edward P. Furlani, Lancaster; Bijan Barzideh, Rush, both of N.Y.

[73] Assignee: Eastman Kodak Company, Rochester, N.Y.

[21] Appl. No.: 751,597

[22] Filed: Nov. 18, 1996

[51] Int. Cl.[6] .................. G03B 9/02; G03B 9/08
[52] U.S. Cl. ............ 396/455; 396/468; 396/508
[58] Field of Search .................... 396/453–455, 396/467, 468, 508, 463

[56] References Cited

U.S. PATENT DOCUMENTS

| | | | |
|---|---|---|---|
| 3,635,141 | 1/1972 | Starp et al. | 396/463 |
| 4,760,420 | 7/1988 | Lan | 396/468 |
| 5,432,576 | 7/1995 | Gregory | 396/463 X |
| 5,619,296 | 4/1997 | Furlani et al. | 396/463 |

Primary Examiner—W. B. Perkey
Attorney, Agent, or Firm—Raymond L. Owens

[57] ABSTRACT

An hard stop is disclosed for use with an aperture mechanism that has at least one blade moveable along a path between a closed position and at least one open position, and at least one hard stop piston that is moveable between a first position, out of the blade path, and a second position, in the blade path, to position the blade in the open position when an edge of the blade contacts the hard stop piston. The hard stop includes a nonmagnetic piston; a ferromagnetic C-core, having first and second pole tips, a magnet attached to the piston and a coil wrapped around the midportion of the C-core. When current is applied in one direction through the coil it causes the magnet and attached piston to move in a first direction to the first position and held in such position by the attraction of the magnet to the first pole tip of the C-core and causes the magnet and attached piston to move to the second position when current is applied in an opposite direction to the coil where it is held in such position by the attraction of the magnet to the second pole tip of the C-core.

9 Claims, 8 Drawing Sheets

ELECTROMAGNETIC DEVICE FOR PROVIDING A HARD STOP FOR MOVING BLADE APERTURE SYSTEMS

CROSS REFERENCE TO RELATED APPLICATIONS

The present invention is related to commonly assigned U.S. patent application Ser. No. 08/655,366, filed May 30, 1996, entitled "Electromagnetic Mechanism for Providing a Hard Stop for Moving Blade Aperture Systems", by Furlani et al. and commonly assigned U.S. patent application Ser. No. 08/748,728 filed concurrently herewith, entitled "Electromagnetic Actuator for Providing a Hard Stop for Moving Blade Aperture Systems" by Furlani et al., the disclosures of which are incorporated herein by reference.

1. Field of the Invention

This invention relates generally to the field of photography and, more particularly, to an improved electromagnetic actuated hard stop having utility in aperture blade type mechanisms.

2. Background of the Invention

U.S. Pat. No. 4,760,420, entitled, "Shutter Mechanism For A Camera" by Lam, discloses a camera shutter mechanism having overlapping plates which are pivotally mounted and connected by a pin sliding in slots in the plates so that the plates move in unison. Springs bias the plates to an overlapping position, covering a hole in the camera body which leads to a lens. One of the plates is struck by a lever which urges the plates against springs causing them to pivot away, until the lever strikes a stop at which point the plates still overlap sufficiently to cover the hole. After the lever strikes the stop the plates continue to move under their own momentum to open up an aperture bound by the edges.

A magnetic control plate with pawls is attracted towards the overlapping plates by an electromagnet so that the pawls engage racks on the plates to arrest the plates at a particular aperture setting. A light metering device or optical sensor is used to determine the position of the plates and thereby to control energization of the electromagnet. The electromagnet must be energized slightly before the desired aperture is reached to allow time for the magnetic control plate to move into the engaged position. When the electromagnet is switched off, the overlapping plates are released which closes the aperture under the action of the springs.

An improvement in the type of shutter shown in the U.S. Pat. No. 4,760,420 patent is disclosed in U.S. Pat. No. 5,432,576, entitled, "Aperture Mechanism Having A Blade Positionable In An Open Position By A Hard Stop" by SanGregory et al. In that patent hard stops are used to define the limits of travel for the aperture plates. The hard stops are positioned in their stopping position by activating an electromagnet that in turn projects a magnet (piston) into the path of the blade. To maintain the piston in that position the electromagnet remains energized. To retract the piston the current flowing through the electromagnet is reversed.

SUMMARY OF THE INVENTION

It is an object of the present invention to minimize the current draw that is needed to actuate and to hold the piston in place as the current is drawn, generally, from a battery.

This object is achieved by an hard stop for use with an aperture mechanism that has at least one blade moveable along a path between a closed position and at least one open position, and at least one hard stop piston that is moveable between a first position, out of the blade path, and a second position, in the blade path, to position the blade in the open position when an edge of the blade contacts the hard stop piston, wherein the hard stop is comprised of:

a nonmagnetic piston;

electromagnet means including a ferromagnetic C-core, having first and second pole tips, a magnet attached to the piston and a coil wrapped around the midportion of the C-core such that when current is applied in one direction through the coil it causes the magnet and attached piston to move in a first direction to the first position and held in such position by the attraction of the magnet to the first pole tip of the C-core and causes the magnet and attached piston to move to the second position when current is applied in an opposite direction to the coil where it is held in such position by the attraction of the magnet to the second pole tip of the C-core.

Advantages

The hard stop of the present invention has a greatly reduced power consumption relative to the current hard stop mechanisms. Additionally, the present hard stop is highly reliable, and easy to manufacture. The use of a ferromagnetic C-core enhances the field across the magnet thereby improving efficiency. The ferromagnetic C-core contains and focuses the magnetic field of the coil precluding it from permeating other circuitry in the camera thereby reducing EMI which can be substantial in open coil prior art devices.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
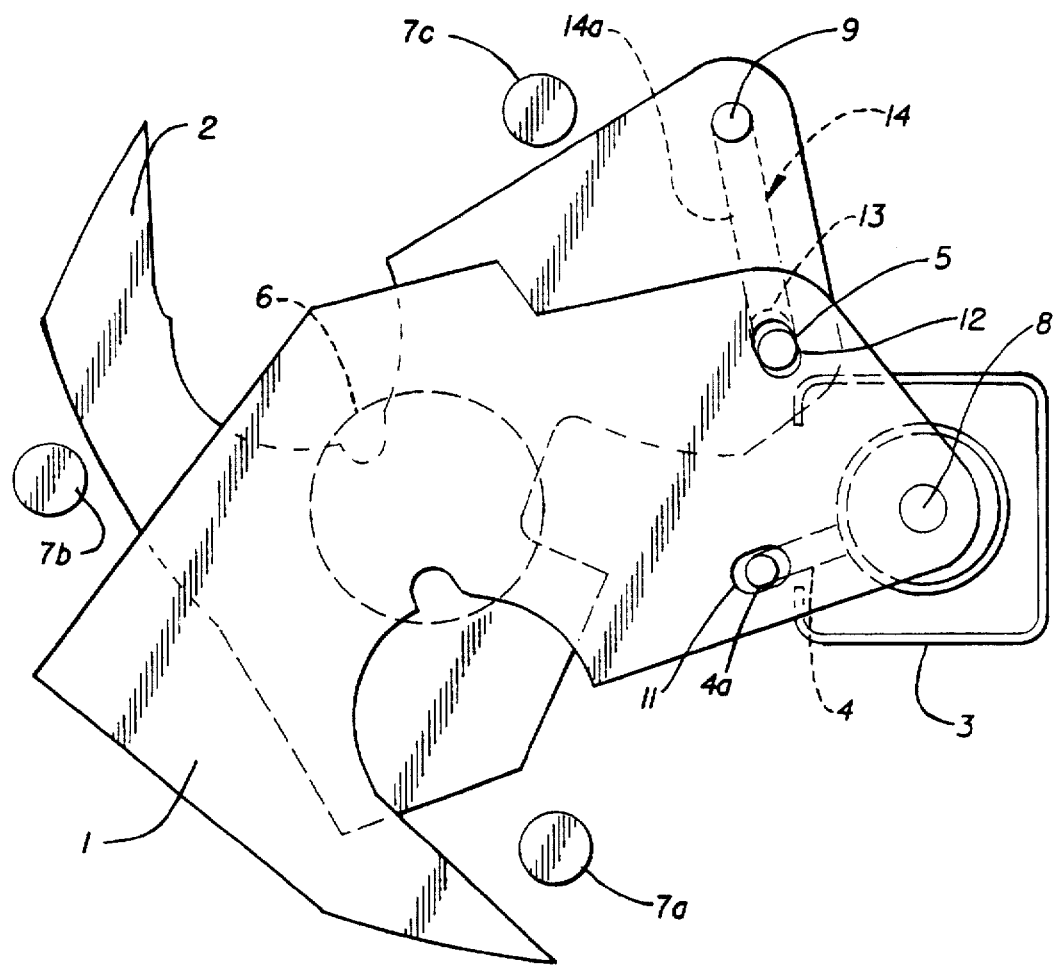
FIGS. 1–5 are top views of a prior art aperture mechanism wherein the present invention finds particular utility.
Figure 2:
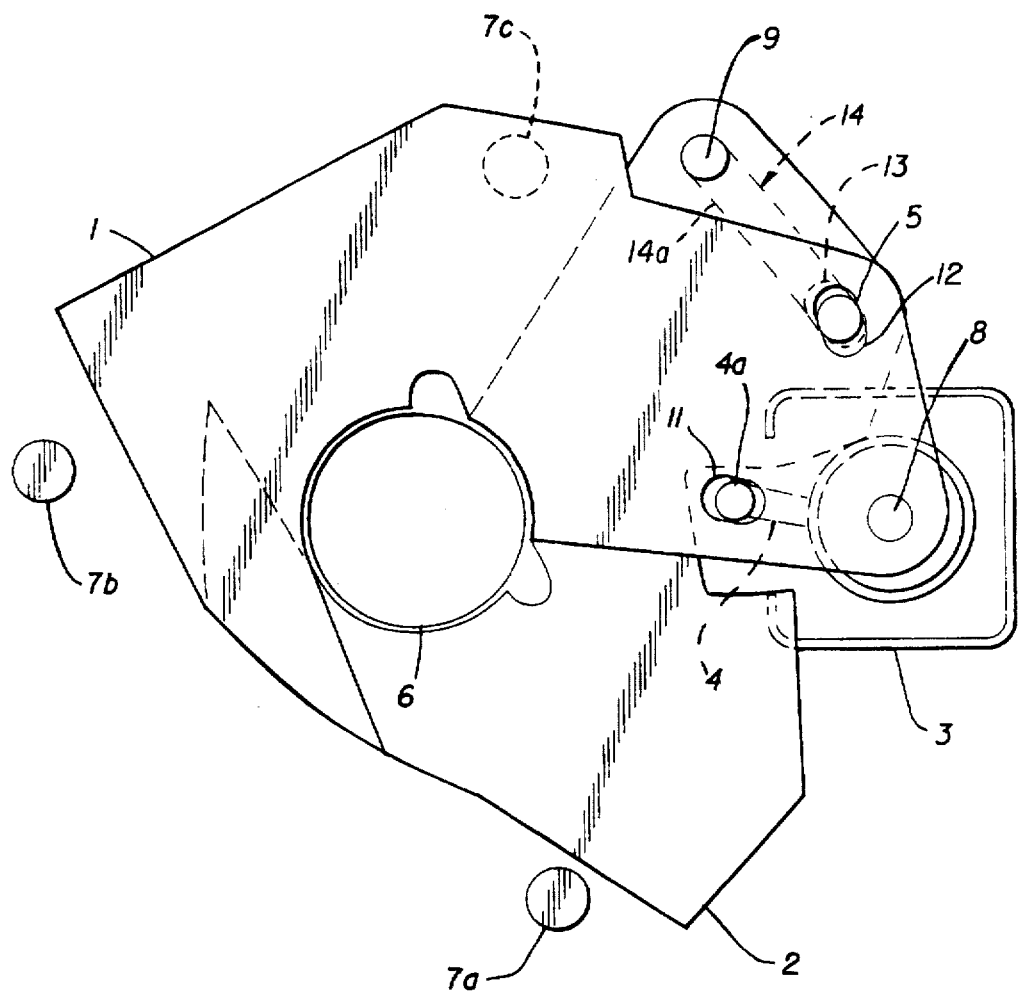

Referring now to FIGS. 1 and 2 which show top views of one embodiment of the present invention. A pair of aperture blades (blades 1 and 2), are displayed in a closed position in FIG. 1. In this position, blades 1 and 2 block light from passing through a camera aperture 6. In FIG. 2 the blades are shown in the fully opened position (aperture 6 is fully uncovered). An actuator 3, used to rotate blade 1, includes an arm 4 to which is connected a pin 4a that fits through a slot 11' in blade 1. A pivot point 8 for blade 1 lies along the axis of rotation for actuator 3. Thus, blade 1 directly follows the rotation of actuator 3.

A link 14 acts as a pivot point for blade 2 at a position 9. Link 14 includes a pin 5 and an arm 14a to which the pin is connected. Pin 5 fits through slots (apertures) 12 and 13 of blades 2 and 1 respectively, thus rotating with blade 2 as it causes blade 2 to follow the motion of blade 1 at this point. It can be seen that as blade 1 rotates clockwise blade 2 is caused to rotate counter-clockwise and vice-versa. Hard stop pistons, 7a, 7b, and 7c, will be described in detail in the description of FIGS. 3, 4, and 5.

Actuator 3 is preferably a rotary magnetic actuator or solenoid. Magnetic attraction torque within actuator 3 keeps the blades rotated to the closed condition when the actuator is not energized. Energizing actuator 3 to rotate clockwise drives the blades opened, as described above. Energizing actuator 3 to turn counter-clockwise returns the blades to the closed condition after proper exposure.

Figure 3:
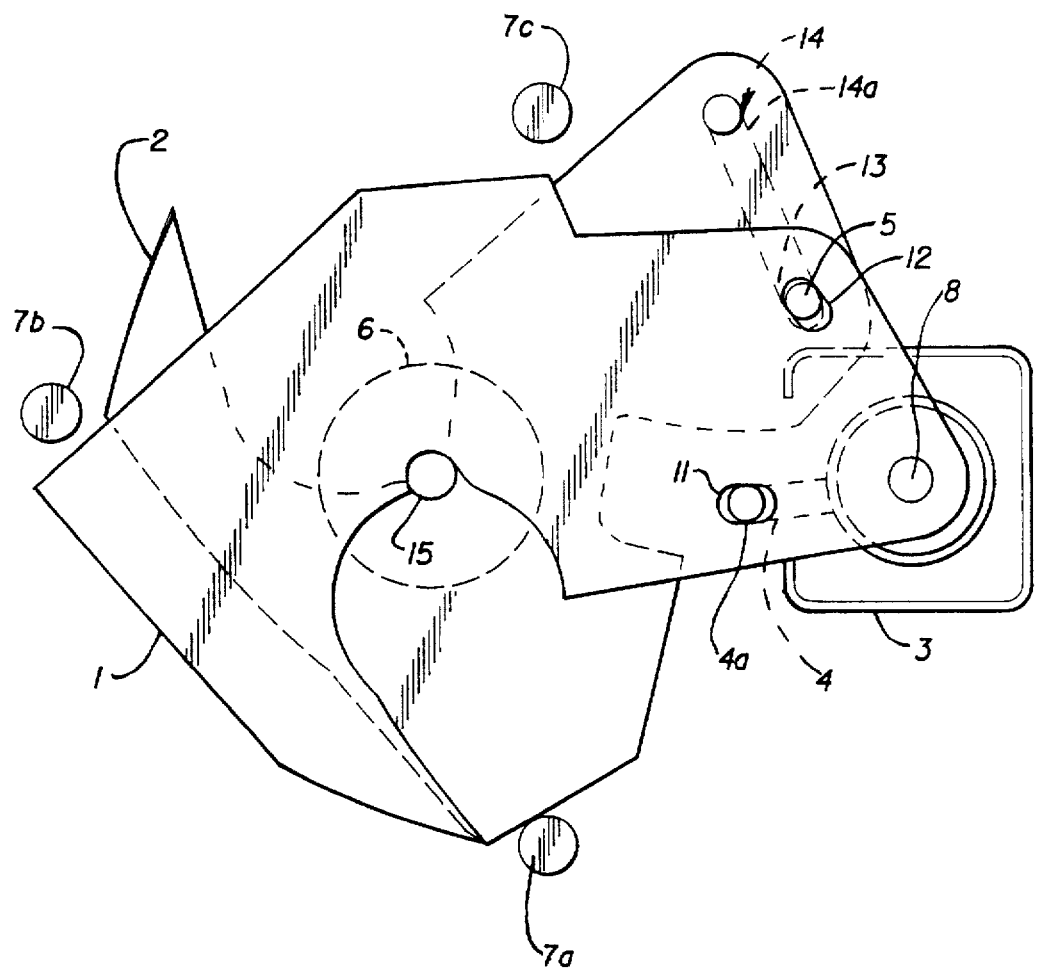
Figure 4:
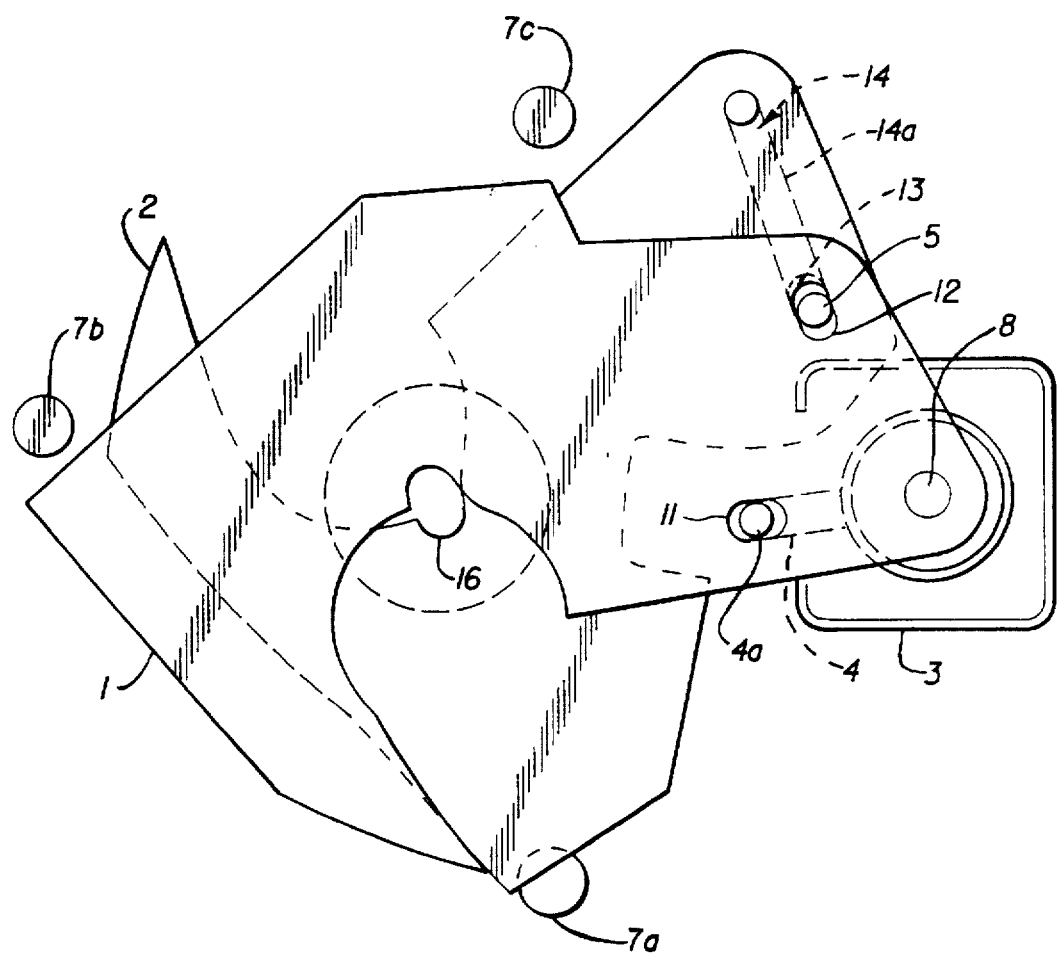
Figure 5:
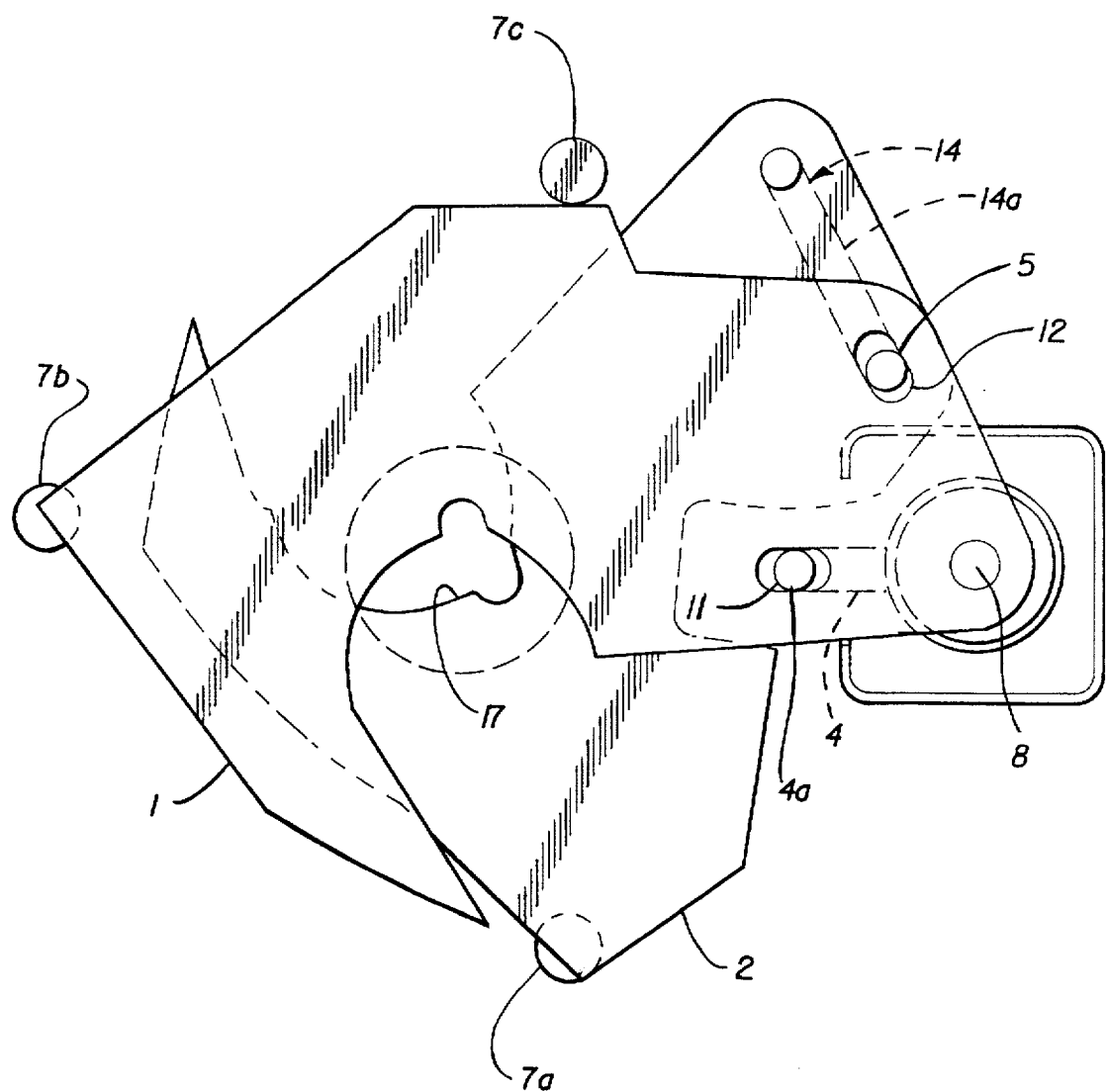

The present invention varies aperture size by using moving hard stop piston to position the blades at discrete degrees of travel. FIGS. 3, 4 and 5 show the shutter opened to three intermediate apertures. In FIG. 3, a hard stop piston 7a, normally out of a plane of rotation of blade 2, is placed in the path of blade 2 to stop the shutter from further opening. Thus, the blades together form an exposure aperture area 15. The geometry of blades 1 and 2 and the position of hard stop pistons 7a–c are selected to minimize bounce of the blades when they strike the pistons.

In FIG. 4, a hard stop piston 7b blocks the path of blade 1, thus exposing an area 16. Piston 7a is not placed in the path of blade 2 in this case or else the blades would stop as shown in FIG. 3. In FIG. 5, a piston 7c stops the shutter to expose area 17. Again, the other two pistons are not employed for this condition and are located out of the plane of rotation of their respective blades.

The hard stop pistons described in the previous paragraphs are preferably made of a permanent magnetic material. These hard stop pistons are moved into the shutter blade path by a magnetic force from nearby coils which are selectively energized. One magnetic hard stop piston is used for each partial aperture (one less than the total number of apertures).

Figure 6A:
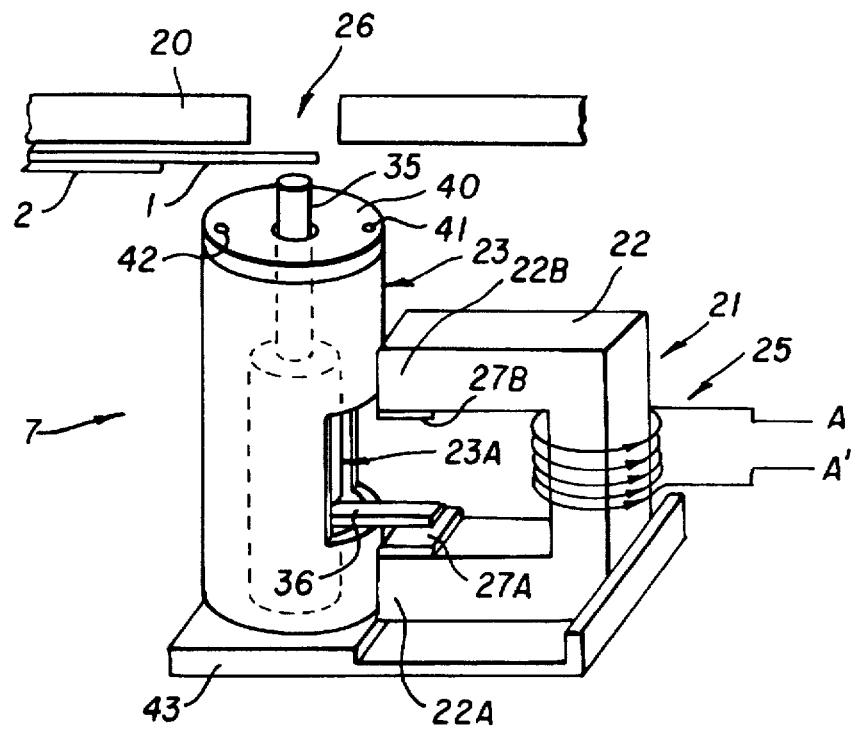
FIGS. 6A and 6B illustrate, in perspective and cross sectional views, the position of the hard stop of the present invention in its non-stopping position.
Figure 6B:
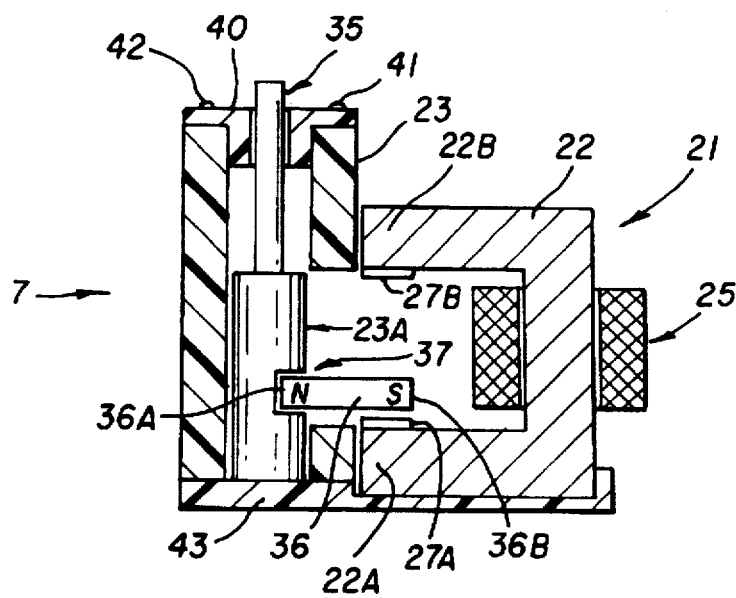

Referring now to FIGS. 6A and 6B, a hard stop 7 includes a piston 35 made from a nonmagnetic material such as plastic, a permanent magnet 36, a plastic support housing 23, and an electromagnet 21 which includes a ferromagnetic C-core 22 with a coil 25 wrapped around its central portion. The piston 35 is supported in housing 23 which is formed with an opening 23a along its length for permitting one end of magnet 36 to be inserted into, and adhered to a notch 37 formed in piston 35. The magnet 36 is polarized along its axis and one of its pole faces 36a is embedded in notch 37 and the other pole face 36b is situated in the gap of C-core 22. It is instructive to note, that when no current flows through coil 25, pole face 36b is attracted to a pole tip 22a of C-core 22 and rests against a stop pad 27A. In this way pole tip 22a provides a first detent position for magnet 36 and piston 35 to which it is attached. In this first detent position, piston 35 is held against and supported by a bottom bracket 43.

Figure 7A:
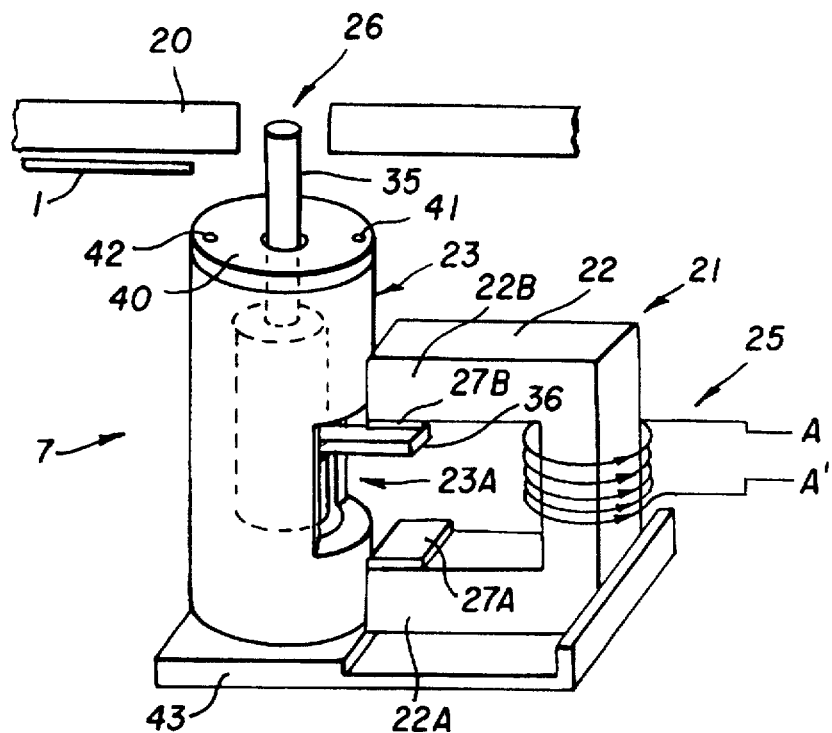
FIGS. 7A and 7B illustrate, in perspective and cross sectional views, the position of the hard stop of the present invention in its stopping position.
Figure 7B:
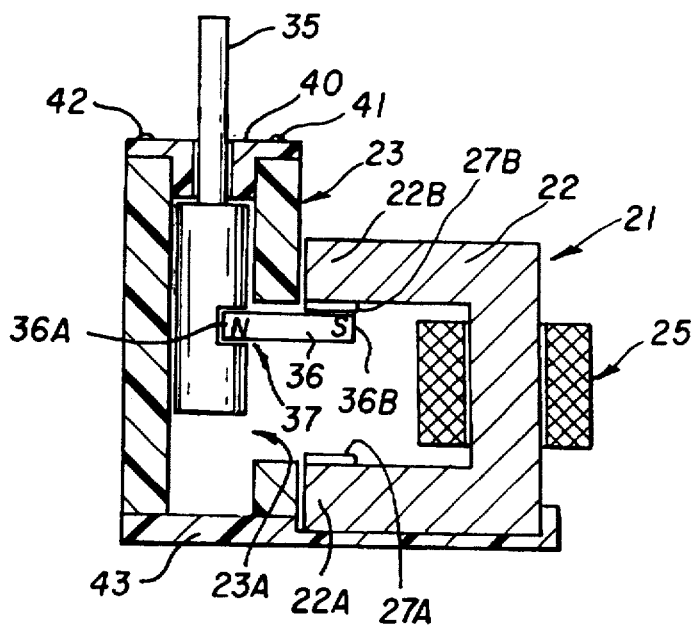

Referring now to FIGS. 7A and 7B, a source of current produced by current driver 54 (shown in FIG. 8), causes current to flow through coil 25 in a first direction which creates a magnetic field in the gap of C-core 22 thereby imparting an upward force to pole face 36b and hence piston 35. This upward force propels piston 35 into aperture 26, which in turn blocks the movement of shutter blade 1. Specifically, the pole face 36b moves towards pole tip 22b of C-core 22 and comes to rest against stop pad 27B. The pole face 36b is attached to pole tip 22b and thereby stays against stop pad 27B even when the current is turned off. In this way, pole tip 22b provides a second detent position for magnet 36 and piston 35 to which it is attached. In this second detent position, piston 35 is held against insert 40 which is attached to plastic housing 23 with pins 41 and 42. The piston can be moved back to its first detent position by reversing the direction of current through coil 25 as is well known.

Figure 8:
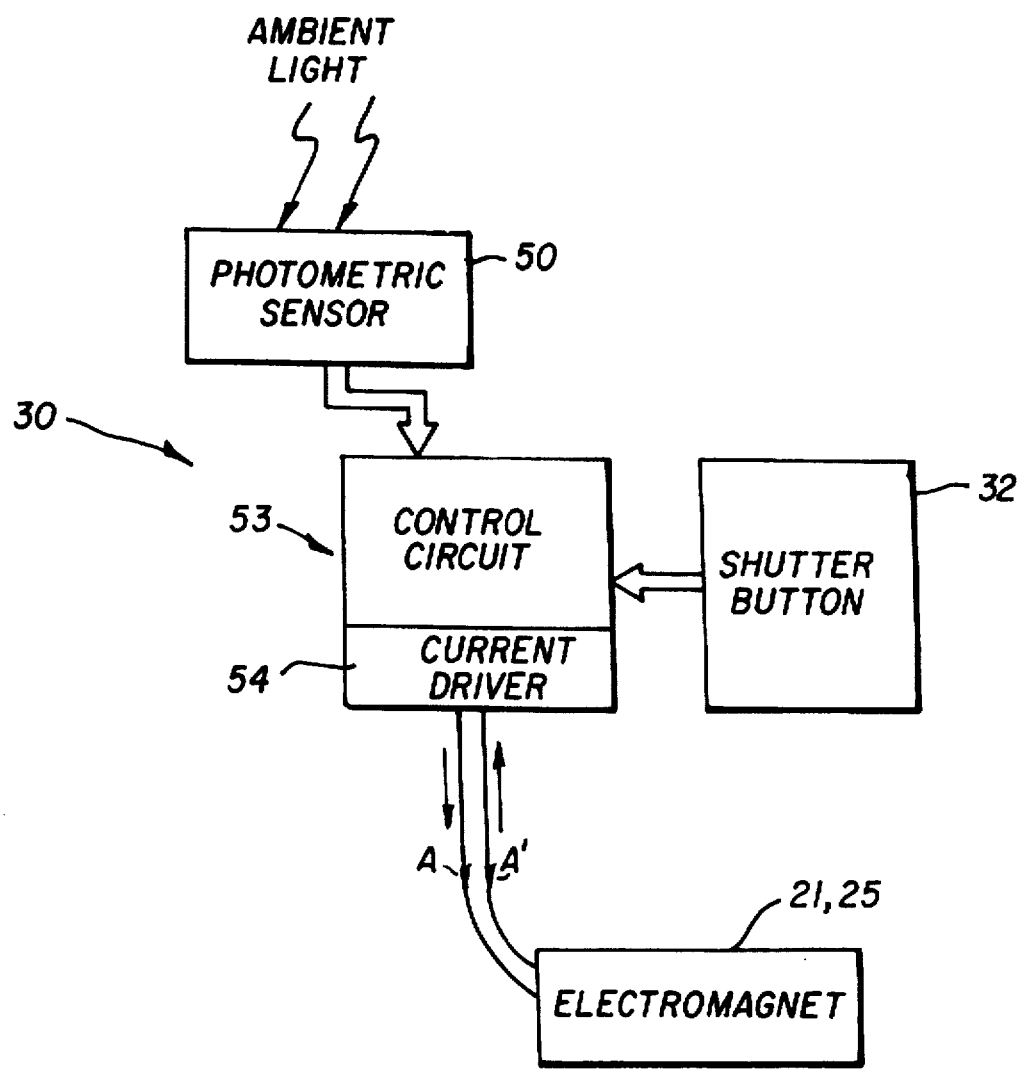
FIG. 8 illustrates, in schematic form, the electronics for controlling the hard stop actuator of the present invention.

Referring now to FIG. 8, the control of the current flow through the coil 25 is controlled by the circuitry 30. A shutter button 32 provides the initial activation signal to a control circuit 53. An additional input is provided by a photometric sensor 50 which supplies an output indicating a low or a high amount of light being presented to the aperture mechanism. If a low amount of light is present the piston should not stop the blade. If a high amount of light is present the piston is to stop the blade. The control circuit 53 controls a current driver 54 for pulsing current through the coil 25 in the direction that causes the associated piston to take the position indicated by the photometric sensor 50. Once in the proper position the current pulse is no longer necessary to hold the piston in position which provides the major advantage of the present invention namely to reduce the amount of current needed for each shutter operation.

The invention has been described with reference to preferred embodiments. However, it will be appreciated that variations and modifications can be effected by a person of ordinary skill in the art without departing from the scope of the invention.

Parts List
1, 2 aperture blades
3 actuator
4 arm
4a, 5 pins
6 aperture
7 hard stop
7a–c hard stop pistons
8 pivot point
9 position
11 slot
12, 13 slots
14 link
14a arm
15, 16, 17 aperture area
20 non-magnetic plate
21 electromagnet
22 ferromagnetic C-core
22A, 22B pole tip
23 plastic housing
23A opening
25 coil
26 aperture
27A, 27B stop pads
30 circuitry
32 shutter button
35 piston
36 magnet
36A, 36B magnet pole faces Parts list (con't)
37 notch inside piston
40 insert
41 pin
42 pin
43 bottom bracket
50 photometric sensor
53 control circuit
54 current driver

We claim:

1. A hard stop for use with an aperture mechanism that has at least one blade moveable along a path between a closed position and at least one open position, and at least one hard stop piston that is moveable between a first position, out of the blade path, and a second position, in the blade path, to position the blade in the open position when an edge of the blade contacts the hard stop piston, wherein the hard stop is comprised of:

a nonmagnetic piston;

electromagnet means including a ferromagnetic C-core, having first and second pole tips, a magnet attached to the piston and a coil wrapped around the midportion of the C-core such that when current is applied in one direction through the coil it causes the magnet and attached piston to move in a first direction to the first position and held in such position by the attraction of the magnet to the first pole tip of the C-core and causes the magnet and attached piston to move to the second position when current is applied in an opposite direction to the coil where it is held in such position by the attraction of the magnet to the second pole tip of the C-core.

2. The hard stop of claim 1 wherein the piston moves in a direction essentially perpendicular to the plane of movement of the blade when the piston moves between the first and the second positions.

3. The hard stop of claim 1 wherein the piston is formed of a non-magnetic material and defines a notch to accommodate one end of the magnet.

4. The hard stop of claim 3 and further comprising a non-magnetic support member for housing and supporting the piston with the attached magnet.

5. The hard stop of claim 3 and further comprising nonmagnetic support members for limiting the range of motion of the piston to between the first and second positions.

6. The hard stop of claim 1 wherein the C-core includes two nonmagnetic stop pads attached to each pole tip of the C-core.

7. The hard stop of claim 4 wherein the magnetic piston is formed as an elongated cylinder that is positioned within the support member.

8. The hard stop of claim 1 and further comprising:

control means responsive to an input for applying a current to the electromagnet means in the first direction upon receipt of a first input and for applying a current to the electromagnet means in the second direction upon receipt of a second input.

9. The hard stop of claim 8 and further comprising a photometric means for sensing light to be controlled by the aperture mechanism for providing the first input to the control means when the level of light is above a first level and for providing the second input to the control means when the level of light is below the first level.

* * * * *